Jan. 14, 1936.  G. WALTHER  2,027,408
METAL WHEEL
Filed April 23, 1931  2 Sheets-Sheet 1
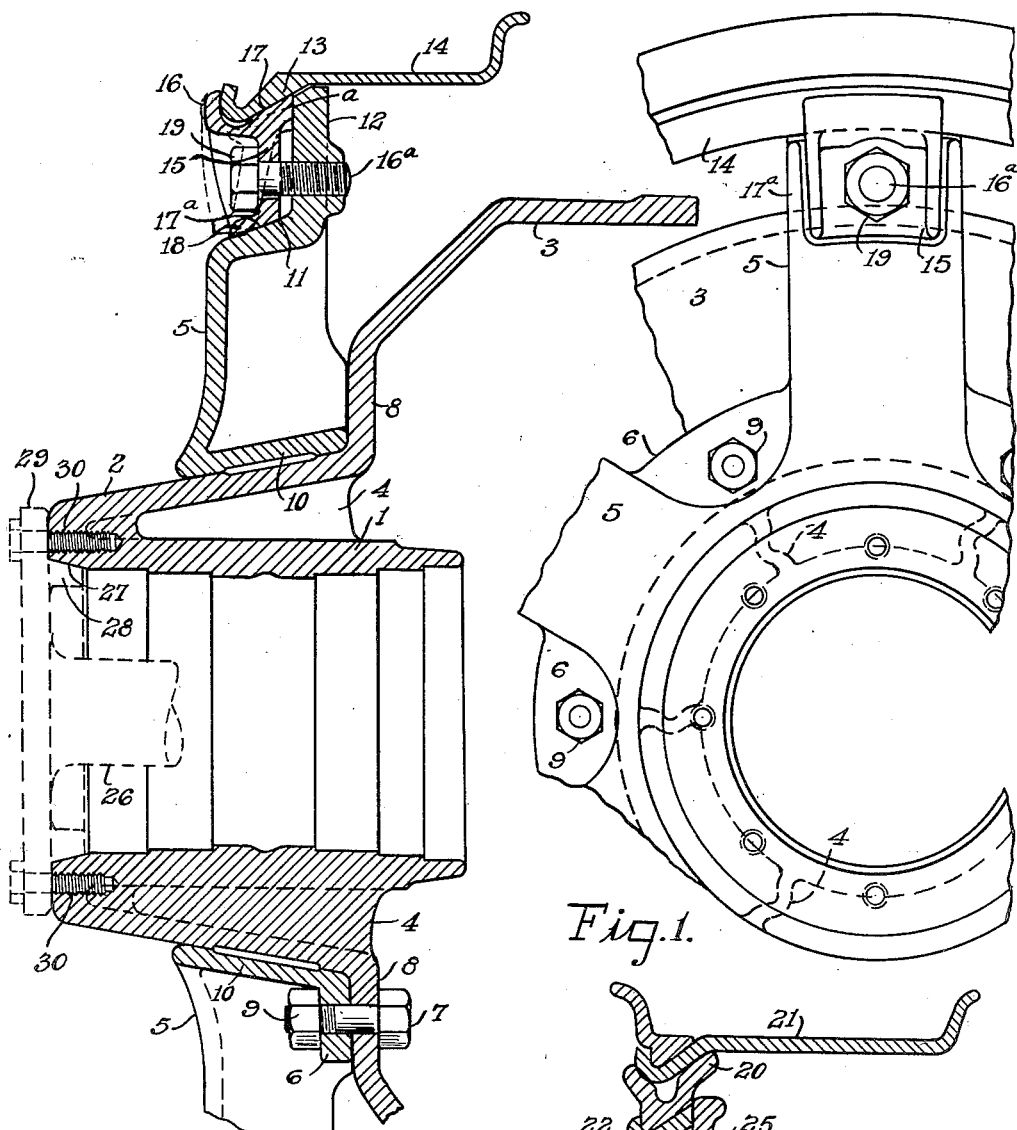

Jan. 14, 1936.  G. WALTHER  2,027,408

METAL WHEEL

Filed April 23, 1931  2 Sheets-Sheet 2

INVENTOR,
George Walther,
BY
Howard S. Smith,
ATTORNEY

Patented Jan. 14, 1936

2,027,408

UNITED STATES PATENT OFFICE 2,027,408

METAL WHEEL

George Walther, near Dayton, Ohio, assignor to The Dayton Steel Foundry Company, Dayton, Ohio, a corporation of Ohio Application April 23, 1931, Serial No. 532,166

8 Claims. (Cl. 301—12)

This invention relates to new and useful improvements in metal wheels, and more particularly those of the spider type.

It is one of the principal objects of my invention to provide a simple, strong and economical single pneumatic spider wheel, with beveled clamp and seating means for positively alining the single bevel overhanging rim or rims in a plane at right angles to the axis of the wheel.

Another object of my invention is the provision of a dual pneumatic spider wheel which embodies the same alining and seating elements that are employed in the single wheel.

Another object of my invention is the provision of resilient rib means between the hub and spoke structures.

It is still another object of my invention to provide a beveled friction drive connection between the hub and the axle shaft.

Other important and incidental objects will be brought out in the following specification and particularly pointed out in the subjoined claims.

Figure 6:
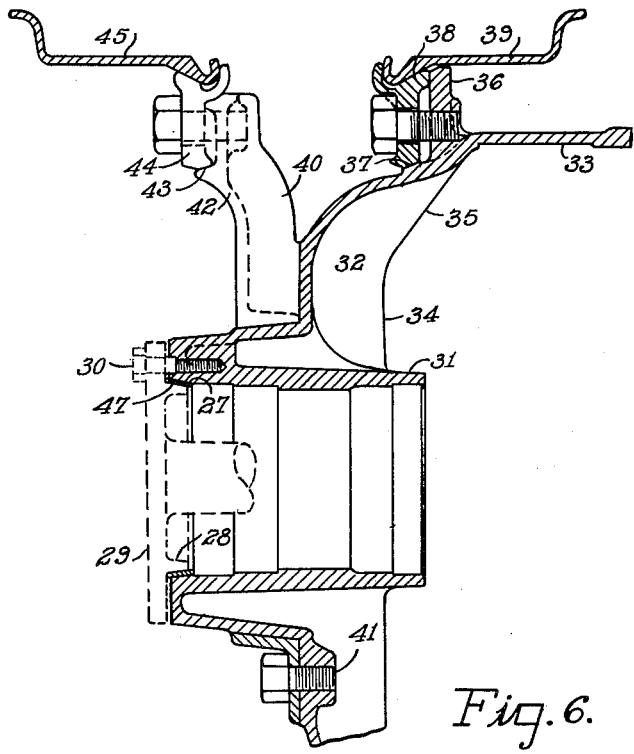
Figure 5:
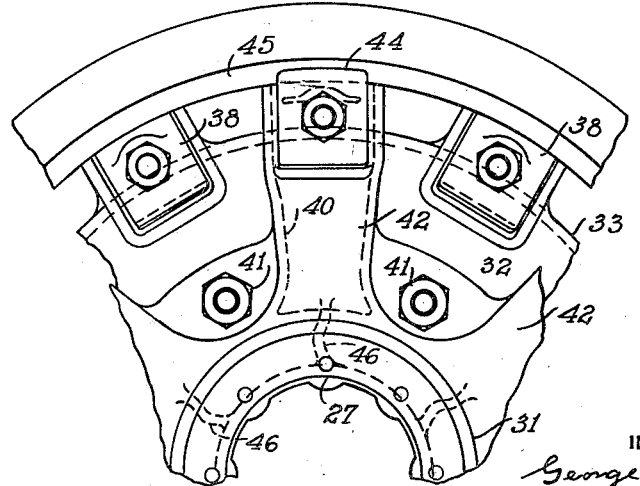

In the accompanying drawings illustrating my invention, Figure 1 is a side elevational view of my improved spider wheel, partly broken away. Figure 2 is a radial sectional view taken through the same. Figure 3 is a front view of one of the alining clamps. Figure 4 is a radial sectional view taken through a modified form of spider wheel, showing a filler ring between the overhanging tire rim and alining clamps. Figure 5 is a side elevational view, partly broken away, of my dual spider wheel. And Figure 6 is a radial sectional view taken through the same.

The various forms of embodiment of my invention will now be described by reference to the accompanying drawings, in which the numeral 1 in Figures 1 and 2 designate the hub of a single pneumatic spider wheel. The hub casting 1 has a tapered radially outer peripheral portion 2 with which a brake drum 3 is integral.

In the hollow port of the hub casting between its radially inner and outer walls, are curved, resilient ribs 4 which are free to straighten when a radially outward pull is exerted upon the tapered wall 2 of the hub.

Demountably secured to the hub casting 1, is a spider structure comprising integrally connected hollow metal spokes 5. Between the base portions of these spokes there are integral webs 6 formed with bolt holes to receive bolts 7 from holes in the straight side portion 8 of the brake drum 3. Nuts 9 are applied to these bolts to solidly secure the spoke structure to the hub casting.

Each spoke 5 is formed with a wide tapered base portion 10 which, when drawn home by the bolts 7, tightly fits the tapered radially outer periphery 2 of the hub casting. Near its radial outer end each spoke 5 is formed with a wide tapered seat 11 that merges into a straight radial part 12 having a beveled front outer edge.

For the purpose of alining and supporting the tire rim 14 upon the spider structure just described, I have provided alining clamps 15. Each clamp comprises an ear-shaped member terminating at its axially outer end in a gutter portion formed by a radial outer flange 16 and a beveled rear seating surface 17 for the tapered radially inner edge 13 of the tire rim 14.

The radially inner edge of each clamp 15 is also beveled to engage the tapered seat 11 formed by its respective spoke 5. In the middle portion of the clamp there is a hole to receive a bolt 16a that projects through a hole in the straight radial part 12 of the spoke. This part of the spoke is reinforced by ribs 17a, while the outboard part of each clamp is reinforced by ribs 18.

The tire rim 14 is mounted on the spider by placing it upon the spoke ends and then applying the clamps 15 to the bolts 16a. After fitting the gutter portions of the clamps to the inner side edge of the rim, nuts 19 are applied to the bolts and tightened. When the nuts are turned against the clamps, they will be forced radially outward by the sliding engagement of their radial inner tapered ends with the tapered seats 11 on the spokes 5 until said clamps are in the full line position shown by the clamp in Figure 2. In this position, the clamp will be vertical to the axis of the wheel to positively aline the rim in a plane at right angles to said wheel axis.

In Figure 4 I have shown a modified form of construction, in which a filler ring 20 is provided with a radial outer beveled gutter portion to fit the beveled inner edge of an overhanging tire rim 21. The radial inner surface of the filler ring is beveled to fit the tapered seating portion of the gutter part of an alining clamp 22 similar to the clamps 15.

These alining clamps 22 are forced radially outward by nuts 23 on the clamping bolts 24, the heads of which are under stop lugs 25 on the outer straight portions 12 of the spokes. By means of the filler ring, tire rims of varying diameters may be mounted upon a spider structure of a fixed diameter.

A friction drive between the axle shaft 26 and the hub 1 is provided in the following manner.

Referring to Figure 2, the radially inner wall of the hub casting has a beveled surface 27 at its axially outer end to receive a beveled flange 28 on the axially inner face of the hub plate 29 at the axially outer end of the axle shaft. When this hub plate is drawn inwardly by the cap screws 30 that enter the hub casting 1, the flange 28 will engage the radially inner beveled surface 27 of that casting to insure a tight connection of the hub plate 29 to it at all times.

In Figures 5 and 6 I have illustrated a dual pneumatic spider wheel embodying the same clamping and seating elements as those set forth in the single pneumatic wheel just described. In this dual wheel the numeral 31 designates a hub having an axially inner radial spider extension 32 with which a brake drum 33 is integral. This extension 32 has a radially inner straight portion 34, an axially inwardly inclined part 35 and a radially outer straight portion 36. In front of the latter the inclined part 35 of the hub extension 32 is formed with a tapered seat 37 for alining clamps 38 similar to the clamps 15.

These alining clamps 38, which are bolted to the hub extension 32, and engage it, in the same manner as the clamps 15, support the axially inner tapered edge of a tire rim 39 in a plane at right angles to the axis of the wheel.

The wheel as thus far described will serve as a single pneumatic. To convert it into a dual pneumatic wheel a spider structure 40 is secured at its straight radially inner end, by bolts 41, to the radially straight part 34 of the axially inner hub extension 32. At their radial outer ends the spoke portions 42 of the spider structure 40 are formed with offset tapered seats 43 for alining clamps 44 similar to the clamps 38. These clamps 44, which are bolted to, and engage, the spider structure in the same way as the clamps 38, support in a positively alined manner, a tire rim 45.

It is thus seen that in the dual wheel illustrated in Figures 5 and 6 the tire rims are supported a uniform distance apart in planes at right angles to the axis of the wheel.

Resilient curved ribs 46 are provided to reinforce the spider structure 42 as indicated by the dotted lines in Figure 6.

A yielding ring 47 inserted between the tapered surface 27 of the hub casting and the beveled flange 28 on the inner face of the hub plate 29 will provide a universal joint connection between these parts.

The brake drum 3 may be made as a separate member of grey iron melted in an electric furnace and superheated to about 2950 degrees Fahrenheit, thereby breaking up the graphitic carbon into smaller particles. There will thus be produced a stronger, denser metal to resist the wear to which brake drums are subjected.

Having described my invention, I claim:

1. A metal wheel comprising a hub and spokes, axially tapered seat portions on said spokes, said spokes having radially straight ends, an overhanging tire rim having a tapered edge, alining wedge clamps between the tapered edge of the tire rim and the tapered seats on the spokes to support the rim, and means on said clamps for engagement with the straight sides of the spoke ends to guide the applying movements of the clamps to a true position in the plane of the wheel to support the rim in a plane at right angles to the axis of the wheel.

2. A metal wheel comprising a hub and spokes, axially tapered offset seat portions on said spokes, said spokes having radially straight ends, an overhanging tire rim having a tapered edge, alining wedge clamps between the tapered edge of the tire rim and the tapered offset seats on the spokes, gutter portions on the radially outer ends of said clamps to fit the tapered edge of the tire rim, and radially straight faced projections on the clamps for engagement with the straight sides of the spoke ends to guide the applying movement of the clamps to a position in a plane normal to the axis of the wheel to support the rim in a plane at right angles to the axis of the wheel.

3. A metal wheel comprising a hub and spokes, axially tapered offset seat portions on said spokes, an overhanging tire rim having a tapered edge, alining wedge clamps between the tapered edge of the tire rim and the tapered offset seats on the spokes to support the rim, the radially inner edges of said clamps having a wide taper for sliding engagement with the tapered offset spoke seats, said spokes having radially straight portions axially inward of, and radially outward of, said seats, and radially straight faced projections on said clamps for engagement with the radially straight portions of the spokes to bring the clamps to a position in a plane normal to the axis of the wheel to support the rim in a plane at right angles to the axis of the wheel.

4. A metal wheel comprising a hub and spokes, axially tapered offset seat portions on said spokes, said spokes having radially straight ends, an overhanging tire rim having a tapered edge, alining wedge clamps between the tapered edge of the tire rim and the tapered offset seats of the spokes to support the tire rim, means on said clamps for engagement with the straight sides of the spoke ends to guide the applying movement of the clamps to a position in a plane normal to the axis of the wheel and bolts for drawing the clamps axially inward against the tapered offset seat portions on the spokes to support the rim in a plane at right angles to the axis of the wheel.

5. A metal wheel comprising a hub and spokes, axially tapered seat portions on said spokes, an overhanging tire rim having a radially inwardly extending tapered bead at its edge, alining wedge clamps in engagement with said tapered seat portions, gutter portions formed on the radially outer ends of said clamps, a filler ring fitted in the gutter portions of said clamps, and a tapered gutter part on said filler ring to fit the tapered bead of the tire rim.

6. A wheel comprising a wheel body, a rim adapted to be mounted thereon, a plurality of lugs movable with respect to the wheel body and each formed to engage a portion of the rim with a given area of contact and to move bodily therewith, wedge means carried by the wheel body and co-operating with each of said lugs to shift the same radially outwardly to apply radially outwardly directed pressure against said rim thereof when said lugs are shifted laterally on the wheel body, and means for clamping the lugs on said wheel body, the wheel body engaging portion of each lug lying substantially to one side of the center of pressure between the rim and the lug, whereby when said lug clamping means is released said lug is freed from the wheel body.

7. A wheel comprising a wheel body, a rim adapted to be mounted thereon, a plurality of lugs movable with respect to the wheel body for engaging the rim and moving the same clear of the wheel body so that the rim is supported entirely by said lugs, each of said lugs engaging said rim over a given area of contact and engaging said wheel body over a given area of contact, means carried by the wheel body and establishing a fulcrum abutment to receive said lug, the centers of pressure passing through said areas of contact being offset with respect to each other to establish an overturning couple reacting against said fulcrum abutment to free the lug from the wheel body, said means establishing a line of force which is disposed to one side of said fulcrum abutment to establish, when said last named means is tightened, a couple opposing said first named couple for clamping the rim on the wheel, the release of said tightening means rendering said first named couple effective to free the lug from the wheel body.

8. A wheel comprising a wheel body having radially outwardly facing seats adjacent the periphery thereof and laterally facing abutment surfaces extending radially outwardly from said seats, a rim adapted to be mounted over the wheel body with the gutter portion of the rim adjacent said seats, clamping lugs having seating surfaces engageable with said seats and rim receiving portions in which the gutter portion of the rim is adapted to be cradled, said rim receiving portions of the lugs being formed to engage the outermost marginal portion of the rim so as to exert substantially axially directed forces thereof and to move bodily with the rim, said rim receiving surfaces and said seats being inclined so that the rim is chorded as the lugs are shifted laterally and radially outwardly along said seats, the center of contact between the rim and the rim receiving portions of each lug being disposed laterally inwardly of the center of pressure between the seating surface of the lug and the outwardly facing seat on which it is mounted, and means for tightening the lugs laterally on the wheel body to bring the laterally inner face of each lug against the associated abutment surface.

GEORGE WALTHER.